United States Patent [19]
Sato

[11] 4,338,641
[45] Jul. 6, 1982

[54] MAGNETIC TAPE DEVICE
[75] Inventor: Hiroshi Sato, Fujisawa, Japan
[73] Assignee: Daiichi Electric Co., Ltd., Fujisawa, Japan
[21] Appl. No.: 131,681
[22] Filed: Mar. 18, 1980
[30] Foreign Application Priority Data
Apr. 13, 1979 [JP] Japan .................. 54-045840
May 29, 1979 [JP] Japan .................. 54-065587
[51] Int. Cl.³ ............... G11B 15/60; G11B 15/32; G11B 5/78
[52] U.S. Cl. .................. 360/90; 242/181; 242/193; 242/210; 360/130.21
[58] Field of Search ......... 360/90, 93, 95, 130.2, 360/130.21, 96.1; 242/193, 76, 181, 210, 201–203; 226/189, 192, 199–200

[56] References Cited
U.S. PATENT DOCUMENTS

| 3,002,706 | 10/1961 | Flan et al. .................. 360/90 |
| 3,114,513 | 12/1963 | Yasuda et al. ............... 242/210 |
| 3,135,475 | 6/1964 | Dodsworth .................. 242/193 |
| 3,189,289 | 6/1965 | Maxey ....................... 242/193 |
| 3,314,625 | 4/1967 | Mahn ........................ 242/193 |
| 3,642,227 | 2/1972 | Lewis ....................... 242/193 |
| 3,662,937 | 5/1972 | Borman ...................... 360/96.1 |
| 3,679,215 | 7/1972 | Roberts et al. .............. 242/193 |
| 3,722,828 | 3/1973 | Kremp et al. ................ 242/181 |
| 3,889,901 | 6/1975 | Hoyer ....................... 242/210 |
| 4,170,787 | 10/1979 | Gunschmann et al. .......... 360/95 |

FOREIGN PATENT DOCUMENTS
291234 10/1971 U.S.S.R. .................. 242/193

OTHER PUBLICATIONS
Airborne/Mobile Instrumentation Recorder, model AR-700 AMPEX.
Monitering Recorder, Model PI-5100 Precision Instrument.

Primary Examiner—Alfred H. Eddleman
Attorney, Agent, or Firm—Stevens, Davis, Miller & Mosher

[57] ABSTRACT

The magnetic tape device includes a supply reel which has a wound tape therein. The device further includes a pair of pulleys. The axis of the first pulley is, at the same level, in parallel to the axis of said supply reel. The axis of the second pulley is not inclined to a rightangle to the direction of the tape length but is at a twisted position against the position which is in parallel to the axis of the first pulley. Therefore, the tape is twisted when it travels "between" said pulleys. The device also includes a take-up reel, the axis of which is, at the same level, in parallel to the axis of said second pulley. The supply reel and the take-up reel are not supported with one common double shaft but are supported with their own strong shaft at their own places. The device, of course, has other means which ordinary magnetic tape devices have.

2 Claims, 5 Drawing Figures

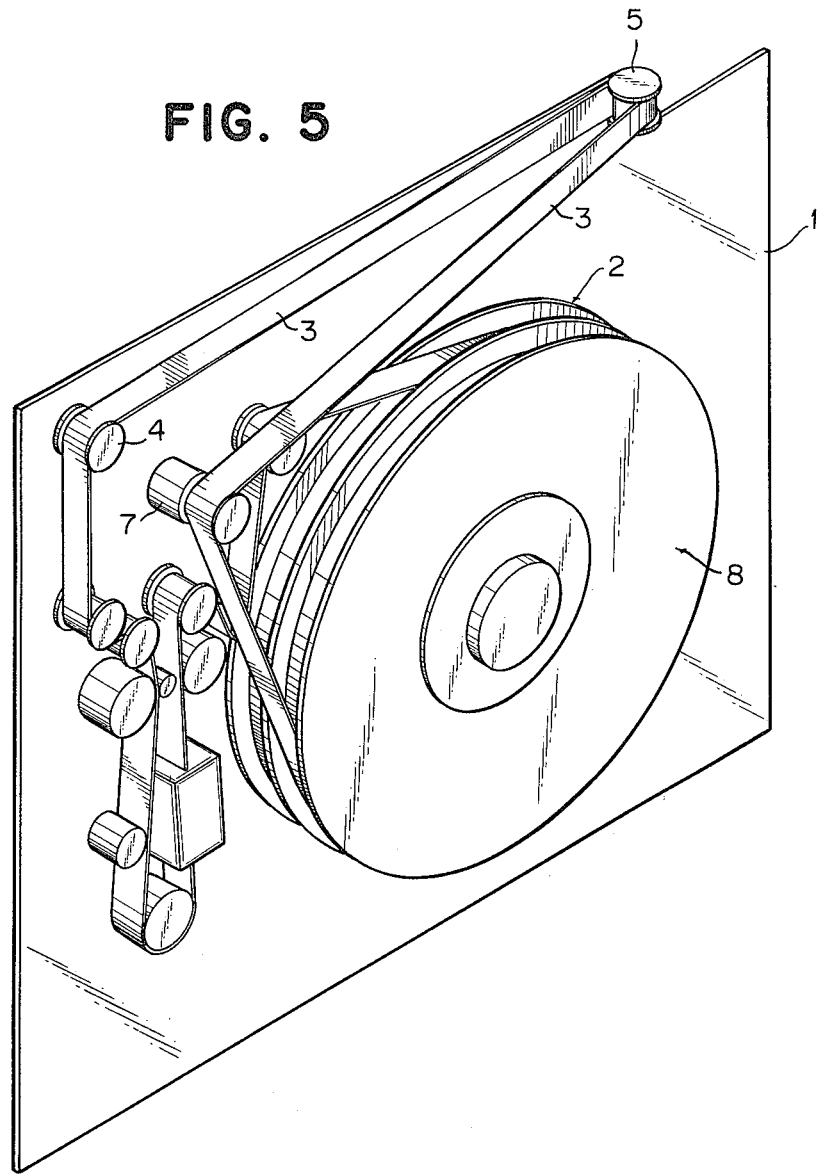

MAGNETIC TAPE DEVICE

BACKGROUND OF THE INVENTION

The present invention relates generally to tape recording devices and more particularly to tape recording devices which can be made smaller because of saving space which a reel of an ordinary device takes.

A take-up reel and a supply reel of an ordinary magnetic tape device are placed side by side horizontally. Besides, said reels are so big in diameter that they take space so widely.

One device has solved this problem by saving the space of one reel, which is placed above the other reel like ones seen in U.S. Pat. Nos. 3,002,706, 3,189,289, 3,314,625, 3,662,937, 3,679,215 and 4,170,787 and USSR Pat. No. 291,234. However, this device has two problems.

The major problem is a transference problem of a tape. The magnetic tape travels from one reel to the other being placed above the other reel. Consequently, the tape has to travel from the bottom reel to the top reel. However, the tape can not be bent horizontally to the tape face, though it can be easily bent in perpendicular to the tape face. Therefore, it employs a taper type pully or an inclined pully in order to spiral the tape thereon. Thereby, the tape can travel from the bottom reel to the top reel as a direction the tape travels to is shifted. However, the angle which the tape travels from said pulley to a take-up reel is slightly different from the direction which said take-up reel takes up the tape to. Besides, the angle and the position of said inclined or taper type pulley need so much preciseness that it takes a lot of time to adjust them when the device is assembled because a small error of the angle or the position makes a big difference in the direction which the tape travels to. Moreover, the tape has to be set carefully so that when the device is to be operated as the tape is twisted on the pulley, which means the twist of the tape has no tolerance for the tape when tightly fitted the pulley. Therefore, any missetting of a tape shifts the direction which the tape travels to, so that the tape is not properly taken up into said take-up reel, which spoils the tape with important data. Perfect setting of the tape is especially required in order not to spoil the tape when the device is operated in a deep sea where nobody can get down.

Furthermore, the magnetic tape is coated with metal powder. Therfore, the edges of the magnetic tape are rough like a file or a sandpaper, which makes a groove in a tape guide made of even hard metal such as stainless steel, if the angle or the position of the taper type or inclined pulley is not accurate, and if it is used for long time. Thereby, a tape will be misguided, which will spoil the tape.

The minor problem is fracture of the shaft of said reels. In this device, one common shaft, which is a double shaft, has to hold two reels which constructs a double reel, as one reel is placed directly above the other. The device has not two solid shafts but one breakable double shaft, which is composed of two concentric layers for rotation of the supply reel and the take-up reel is different. Besides the reels are heavy. Consequently, one breakable double shaft has to hold two heavy reels with tape, Therfore, it easily breaks when it is greatly shocked.

Especially, it makes a great problem when it is operated in a deep sea in order to get important data therein. Because a distance between the surface and the bottom of a deep sea is so great, a magnetic tape device is dropped down very fast with a heavy weight in order to get to the sea bottom as soon as possible. Thereby, it is greatly shocked when it runs against the sea bottom. Moreover, it is greatly shocked when it comes back to the surface for the heavy weight is cut away be explosion. Even a small explosion shocks the device as it is in water. A device of another similar invention such as U.S. Pat. No. 3,135,475 employs a guide plate in order to shift the tape position. However, it also has the same difficulty as the above mentioned device because of an angle of the guide plate and also the double shaft problem. Another device of another invention relating to the present invention such as U.S. Pat. Nos. 3,642,227 and 3,314,625 employ synchronized pulleys in order to shift the tape position. However, it is impossible to drive a tape exactly at the same speed at each pulley because of inbalance of diameters of pulleys and so on, which causes tape damage. Only a film with a chain of holes and tooth-pulleys can accomplish it, but it needs a complicated mechanism, which causes higher costs.

The present invention has solved these problems by twisting a tape "between" pulleys. The device of the present invention employs a means not to spiral a tape but to twist a tape, so that the tape can travel anywhere without damage of tape, and so that the difficulty of adjustment of an angle of incline of a pulley at production is eliminated. Thereby, a take-up reel can be placed anywhere without relation to a supply reel, so that the reels can have their own solid shafts instead of a weak double reel. And the device of the present invention employs the means to twist the tape not "on" a pulley like a spiral means but "between" pulleys, so that tolerant twist can be made. Therby, the tape can properly taken up into the take-up reel.

SUMMARY OF THE INVENTION

According to the present invention there is provided a magnetic tape device comprising a supply reel; a tape being wound in said supply reel; a pair of pulley, the first pulley being in parallel to the supply reel as an ordinary pulley of an ordinary magnetic tape device, and the second pulley being placed at twisted position at right angles to the direction of the tape length, so that said tape is not being spiraled but is being twisted between said pulleys while traveling between said pulleys; a take-up reel taking up said tape traveling from said second pulley, and being in parallel to said second pulley; and other ordinary means being used in an ordinary magnetic tape device.

Another pair of pulleys may be used between said second pulley and said take-up reel so that it twists back the tape at the backside of the device or at another place of the device. Another pulley may be used between said second pulley and said take-up reel alternatively instead of said additional pair of pulleys, which means said second pulley and the third pulley are common. The take-up reel can be placed anywhere on the device if it is not placed directly above or under the supply reel. Thereby, the reels need not use one common weak double shaft but can use their own strong solid shaft at their own places. The device of the present invention need not use a guide plate nor synchronized pulleys.

BRIEF DESCRIPTION OF THE DRAWINGS

FIG. 5 is also a perspective view of another embodiment of the present invention.

DESCRIPTION OF THE PREFFERRED EMBODIMENT

Figure 1:
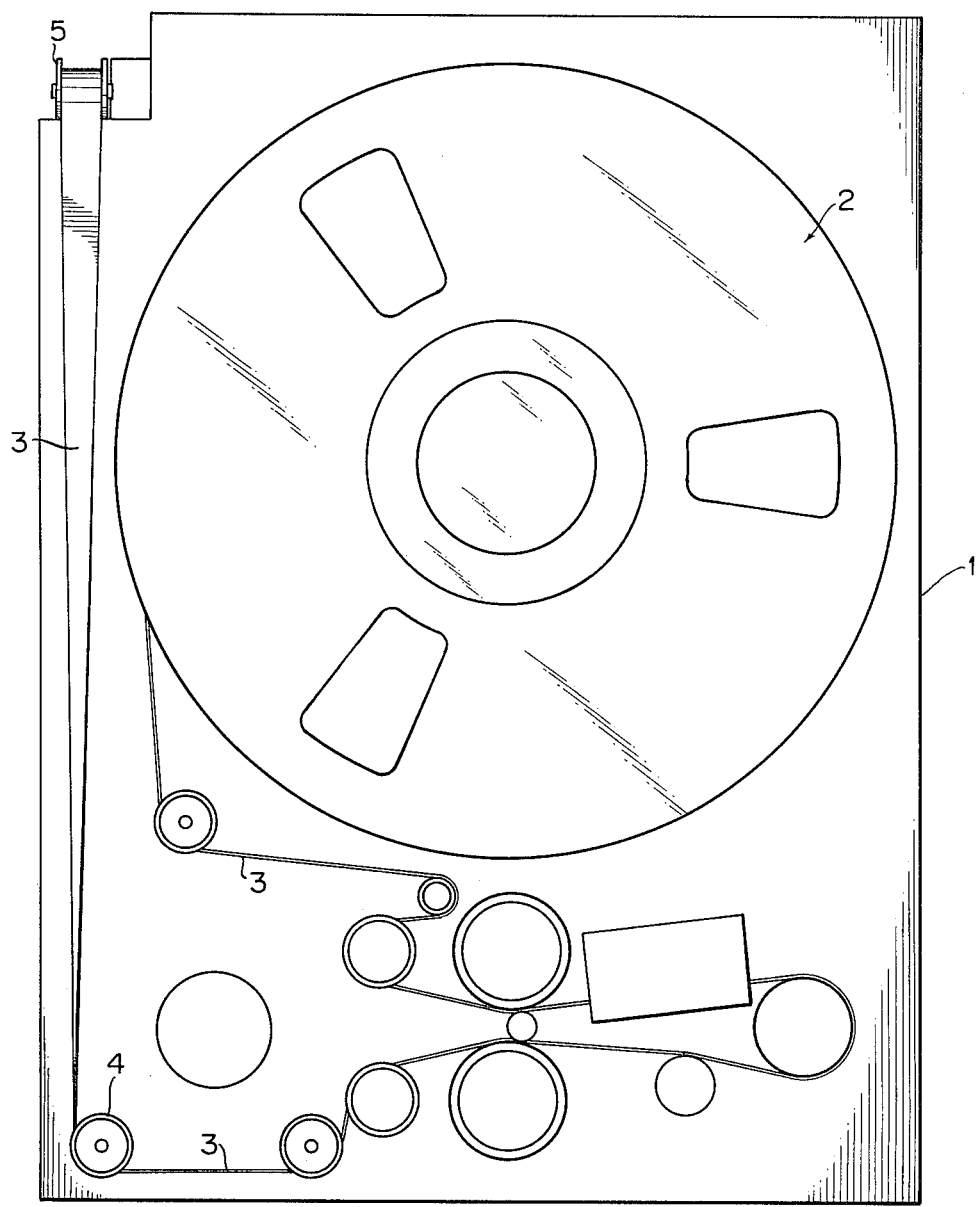
FIG. 1 is a plane view of one embodiment of the present invention.
Figure 2:
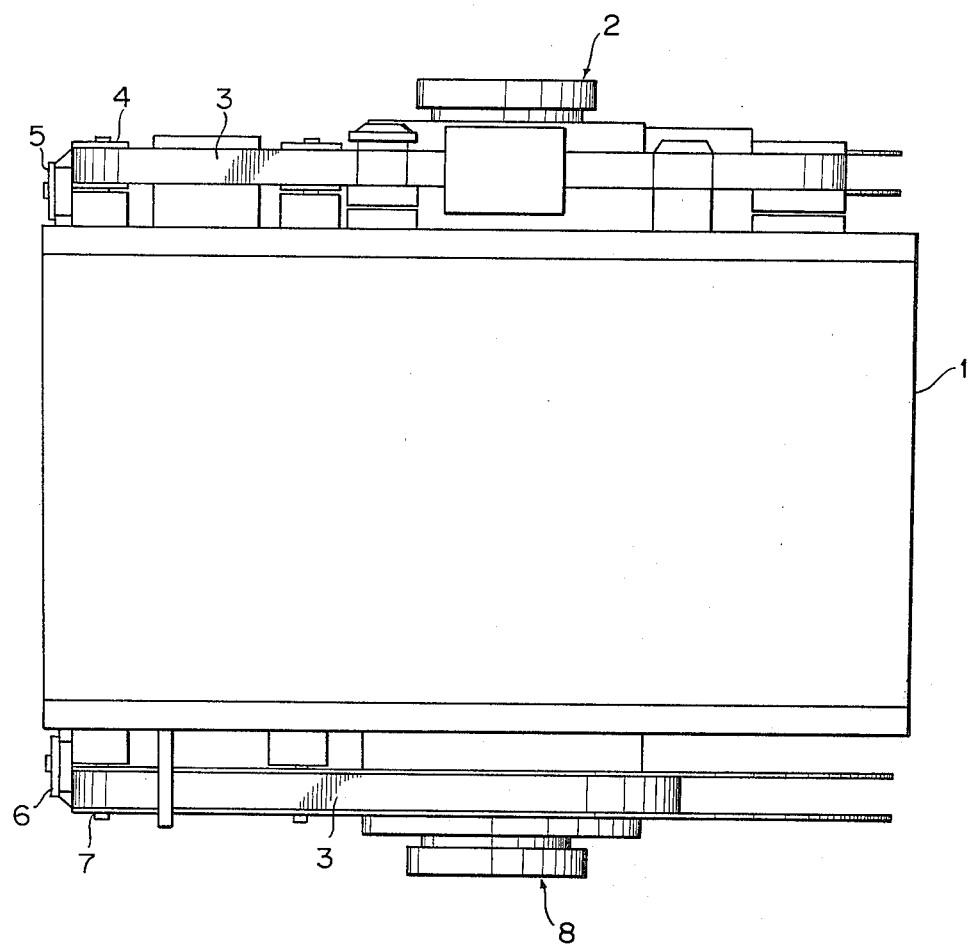
FIG. 2 is a front view of said embodiment.
Figure 3:
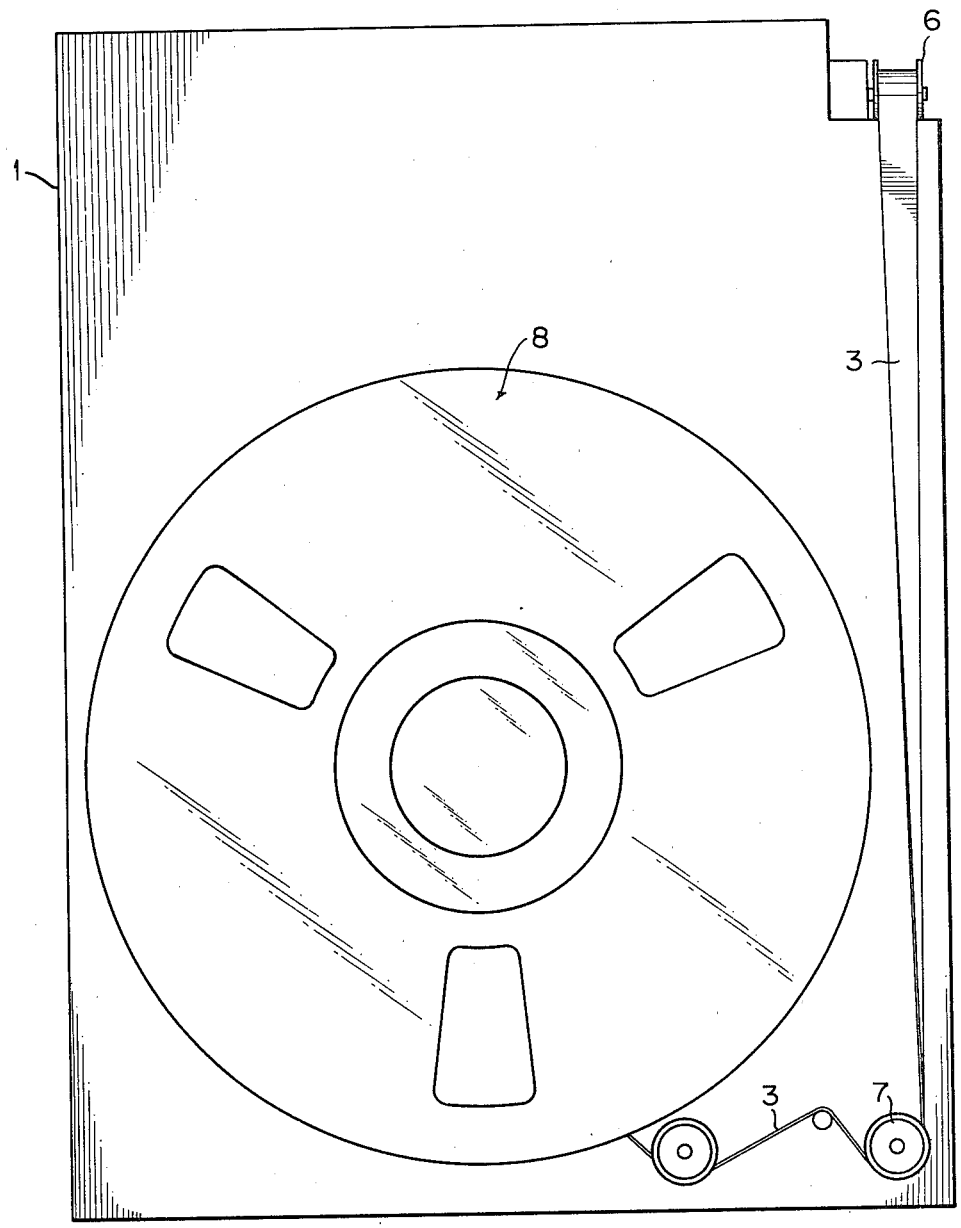
FIG. 3 is a bottom view of said embodiment.

Referring now to FIGS. 1, 2 & 3 there is illustrated therein a magnetic tape device 1 which is constructed according to the teaching of the present invention. As shown in FIG. 1, the device 1 includes a supply reel 2 with a magnetic tape 3 therein which travels to a take-up reel 8 as shown in FIGS. 2 & 3 through ordinary means of an ordinary magnetic tape device and through a pair of pulleys 4 & 5 as shown in FIGS. 1 & 2 and another pair of pulleys 6 & 7 as shown in FIGS. 2 & 3.

The axis of the shaft of the first pulley 4 of said first pair of pulleys is, at the same level, placed in parallel to the axis of the shaft of said supply reel 2 as shown in FIGS. 1 & 2. And the axis of the shaft of the second pulley 5 of said first pair of pulleys is placed at a twisted position by 90° as shown in FIGS. 1 & 2. Thereby, said tape 3 is not spiralled on an inclined pulley but is twisted by 90° between said first and second pulleys 4 & 5 when it travels there as shown in FIG. 1. The axis of the shaft of the second pulley 5 is not at an inclined position but at a twisted position as mentioned above, which means the axis is at a right angle position to the tape length, so that the tape does not travel spirally. Whereas, an inclined shaft of a pulley is not at right angle position to the direction of the tape length but at a slanted or an inclined position to the right angle position. Said third pulley 6 is in parallel to said second pulley 5, and said fourth pulley 7 is placed at twisted position by 90° as shown in FIG. 3, so that said tape 3 is twisted back between said pulleys 6 & 7. Finally, said take-up reel 8 is attached to the bottom of the device 1 through its own strong rotatable shaft threfor. Said shaft is, at the same level, in parallel to the shaft of said fourth pulley 7 as shown in FIGS. 2 & 3.

Said second pulley 5 is twisted by 90° in this embodiment. However, it does not limit to 90°. Any angle is possible so as to match with a trapezoid box of the device 1 or to place the take-up reel anywhere. And said tape 3 can travel diagonally from said second pulley 5 to said third pulley 6, if said third pulley 6 is placed at the right side in FIG. 2 and if these pulleys 5 & 6 are twisted at a suitable angle.

Said second pulley 5 and said third pulley 6 are in parallel in this embodiment. However, it does not limit to being in parallel, so that said tape can be twisted between them again if necessary.

Figure 4:
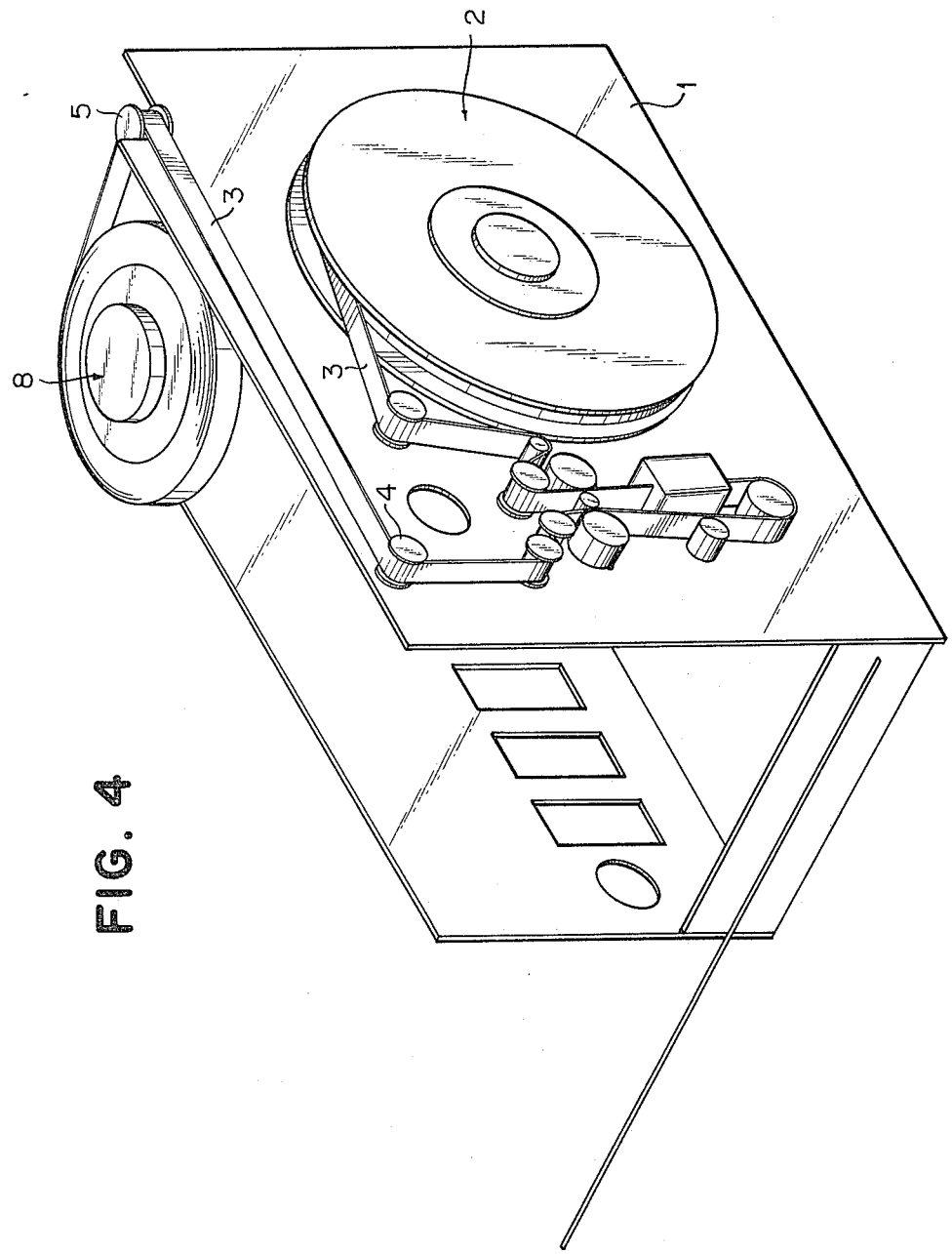
FIG. 4 is a perspective view of another embodiment of the present invention.

Another embodiment of the present invention is shown in FIG. 4, wherein said second pair of pulleys 6 & 7 is omitted and said take-up reel is parallel to said second pulley 5 and takes up said tape 3 directly traveling from said pulley 5. Said second pulley 5 is twisted by 90° in this device, too. However, it does not limit to 90° here eather.

This invention employs the means that twists a tape "between" pulleys. Thereby, it provides easy and safe production and operation Said supply reel 2, said take-up reel 8, a head in said ordinary means, a tape guide in said ordinary means and/or so on can be used alternatively instead of said first pulley 4 and/or the last pulley; at is, said second pulley 5 in case of one pair of pulleys, and said fourth pulley 7 in case of two pairs of pulleys because said tape 3 can be twisted "between" them, which means "in the air".

I claim:

1. An underwater magnetic device, comprising:
   (a) a first and a second shaft;
   (b) a supply reel connected to said first shaft;
   (c) a first pulley substantially coplanar with said supply reel;
   (d) a second pulley rotatable about an axis whose said axis is at a substantially 90° angle relative to the axis of said first shaft;
   (e) a third pulley rotatable about an axis whose said axis is substantially parallel with the axis of the second pulley;
   (f) a fourth pulley rotatable about an axis whose said axis is at a substantially 90° angle relative to the axis of said second and third pulleys;
   (g) a take-up reel connected to said second shaft, said take-up reel being substantially coplanar with said fourth pulley; and
   (h) a tape which is connected to said supply reel and said take-up reel, whereby the first pulley is connected to said tape between said supply reel and the second pulley, the second pulley is connected to the tape between the first pulley and the third pulley, the third pulley is connected to the tape between the second pulley and the fourth pulley, and the fourth pulley is connected to the tape between the third pulley and the take-up reel.

2. An underwater magnetic device as defined in claim 1, wherein said supply reel is located on one side of the underwater magnetic device while said take-up reel is located on an opposite side of the underwater magnetic device, the planes of the supply reel and the take-up reel being substantially parallel.

* * * * *